Oct. 8, 1946.　　　　O. BRUMMER　　　　2,408,909
ANNULAR FLUID SEAL
Filed June 24, 1944
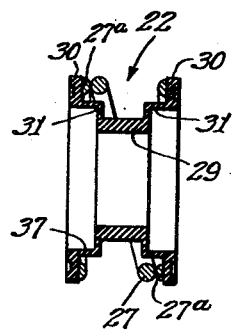
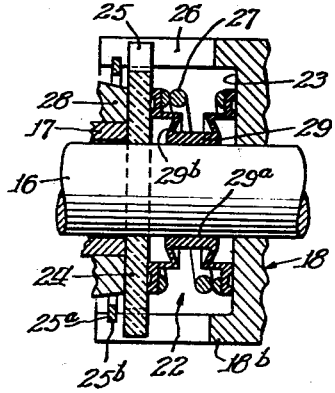
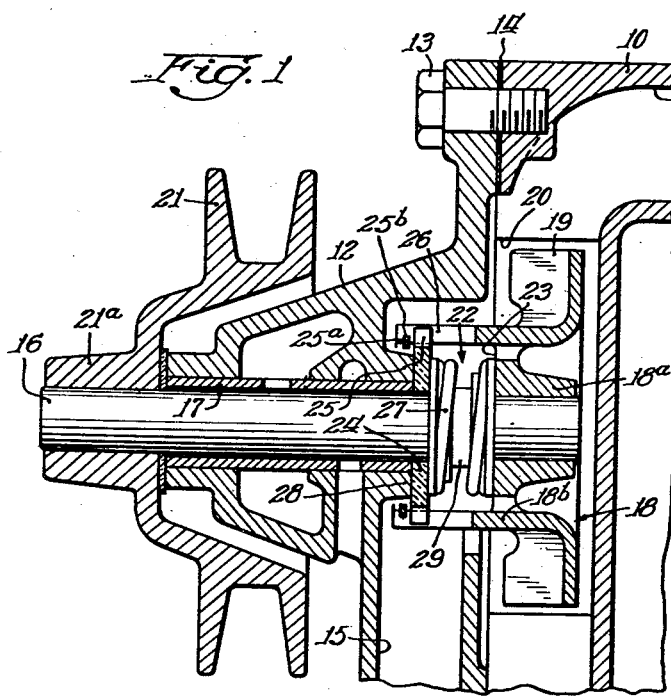
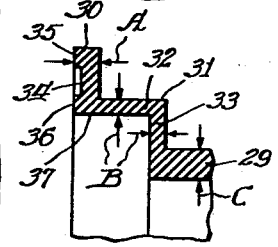
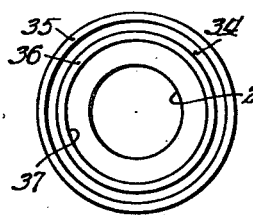
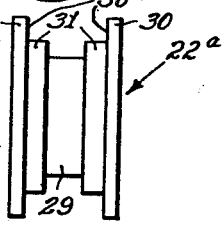
Inventor:
Olin Brummer
By: A. Trevor Jones
Atty.

Patented Oct. 8, 1946

2,408,909

UNITED STATES PATENT OFFICE 2,408,909

ANNULAR FLUID SEAL

Olin Brummer, Oak Park, Ill.

Application June 24, 1944, Serial No. 541,870

3 Claims. (Cl. 286—11)

This invention relates to annular fluid sealing means for relative rotatable parts especially such as shafts and their bearings in connection with pumps employed for the circulation of water for automobile engine cooling purposes, and more particularly sealing devices of this type which do not seal directly on the shaft itself.

As is well known to those skilled in the art to which my invention relates, the sealing elements are the parts which are most likely to fail in operation under variations from the normal which are frequently likely to occur, particularly in motor vehicles where perfect operation under both normal and stress conditions is highly essential.

Among other objects, the present invention aims to provide such a seal which is markedly free from objections to prior constructions, which can be readily placed in position quickly by inexperienced maintenance operatives without danger of being incorrectly inserted, and which has enhanced characteristics of longevity, sturdiness, and sealing qualities.

The invention will be exemplified as applied to one illustrative form of water pump of an internal combustion engine and adapted to substantially eliminate leakage of water from the water jacket and its associate passages which might otherwise find its way into the bearing of the pump drive shaft and not only cause loss of cooling fluid but result in destroying the lubrication of the shaft, this leakage prevention being accomplished while at the same time permitting yielding movements of the shaft either eccentrically or longitudinally without disturbing the sealing action, the seal readily contracting or expanding to accommodate itself to such movement, as well as wear of the parts, without danger of distortion or failure.

An important aspect of the present invention is the provision of a seal device having a high degree of collapsibility while still being resilient and which is accomplished by a novel combined telescoping and diaphragm action of the rubber-like part.

These and other objects of the invention will more fully appear from the following specification, taken together with the accompanying drawing, in which—

Figure 1 is a sectional view through an illustrative pump construction showing in elevation my improved sealing means associated therewith;

Figure 2 is an axial sectional view through my improved sealing means shown in Figure 1, the sealing means being uncompressed;

Figure 3 is a view somewhat similar to Figure 2 but showing the sealing means compressed, parts of the associated structure being shown in section, together with a portion of the shaft which passes therethrough;

Figure 4 is an enlarged fragmentary sectional view corresponding to one corner of the structure of Figure 2, that is the upper left-hand corner as shown in the view, enlarged for purposes of a more detailed description in accordance with the present invention;

Figure 5 is an end view, again on the scale of Figures 2 and 3, of the rubber-like body of the sealing means; and Figure 6 is a side elevational view of said body and being the view thereof shown in Figure 1 with the metal spring omitted.

Referring in detail to the illustrative construction shown in the drawing, the numeral 10 may represent a portion of the engine block of an internal combustion engine which may be jacketed as by the passage 11 therein for the circulation of a cooling fluid, such as, water or the like. The pump casing 12 may be secured to engine block 10 as by the usual bolts 13, only one of which is here shown, with the usual gasket 14 therebetween, the pump casing having an orifice 15 which may communicate with the radiator of the power plant. Extending through the pump casing 12 is a rotatable shaft 16 rotatable in a bearing member 17 carried by the casing. Secured on the shaft 16 to rotate therewith is the usual impeller 18 having blades 19 which revolve in an enlargement 20 of the water-jacket passage 11 to cause the water to circulate therein from and to the radiator. The impeller 18 may be secured to shaft 16 as by a press fit of its hub 18a thereon. At the other end of the shaft 16 is secured, to rotate with the shaft, a pulley 21 to take the drive belt of the pump. The pulley 21 may be secured to the pump drive shaft 16 also by a press fit of its hub 21a thereon, as is well known in the art.

So as to prevent or at least minimize the entrance of water into the bearing surface between the shaft 16 and its bearing member 17, an annular seal indicated generally by the numeral 22 is provided, the seal in this instance seating at one end against the surface 23 of the impeller hub 18a, and at its other end against the usual friction disk or washer 24 which may be of carbon or of a phenolic condensation material impregnated with graphite or other self-lubricating substance, as is well known and need not be here further described. In this instance the washer 24 is keyed to the impeller 18 as by radial tongues 25 on the washer which are received in slots 26 in the impeller, the impeller 18, seal 22, and washer 24, thus all rotating with the shaft 16. The coil spring 27 is inserted between the enlarged face ends of the seal 22 and tends to expand the seal axially, while, through the intermediation of the seal, pressing the washer 24 against the cylindrical portion 28 of the pump casing 12 which carries the bearing 17. Since the seal 22 and its associated spring 27 are normally maintained under some compression at all times (this being effected by the initial press-fit assembly of the pulley 21 with the shaft 16), the seal 22 thus closes off the space between the washer 24 and the impeller surface 23 while the rotative close frictional abutment of the washer 24 with the portion 28 seals this point and prevents water from reaching the bearing 17. To prevent accidental disengagements of parts just described from the impeller, a removable spring ring 25b is seated in a groove 25a in the impeller fingers 18b which however does not interfere with expansion and contraction of the seal in use.

The present invention being directed to improvements in the seal 22, attention will now be directed in detail to the latter, which in accordance with the present invention, comprises an annular body 22a of flexible, resilient rubber-like or elastic material (for example, natural rubber or preferably a synthetic elastomer of which several are now on the market) which does not deteriorate or lose its elastic properties due to heat, cold, moisture or the material with which it comes in contact and which may be cast or molded, in a manner well known to the art and which need not be here described, to the form here shown, for example, following the present invention.

As here shown, the body 22a of the seal 22 is reel-like in form and comprises a sleeve or tube part 29 which is located centrally of the seal, a face part 30 in this instance at each end of the seal, and a connecting part 31 between and connecting the tube part and the face parts, the face parts being of larger diameter than the tube part, and the connecting parts of reduced diameter with respect to the face parts but again of larger diameter than the tube part.

As best shown in Figure 4, the connecting part 31 is of angular cross-section comprising a cylindrical axially extending portion 32 energing from the face part and co-axial with the tube part 29 and an annular radially extending flange-like portion 33 in a plane transverse to the axis of the tube and merging into the tube part. Furthermore, the tube part 29, as best seen in Figure 4 is of a cross-sectional wall thickness materially greater than that of the cross-sectional wall thickness of the connecting part 31. In expansion and contraction of the seal, the face parts, while remaining substantially parallel, move with the connecting parts which tend to pivot so to speak where the latter merge into the tube part as at 29b. The cross-sectional thickness of the face part 30 is preferably somewhat greater than that of the connecting part 31 but slightly less than that of the tube part 29. For example, following the present invention, the cross-sectional thicknesses of these respective parts are advantageously, say, as follows: .050 of an inch for the face part, .030 of an inch for the connecting part, and .065 of an inch for the tube part, substantially as illustrated in Figure 4, at "A," "B" and "C" respectively. The distance across the corner at the junction between 32 and 33 is proportionally greater than .030 inch, since this corner, as clearly shown in my drawing, is a square, sharp corner, and similarly, the corner between 33 and 29 is square and sharp, thus increasing the thickness of the material at these corners.

When, now, the seal is further compressed, as for example, by an axial movement of the shaft 16 toward the left in Figure 1 under stresses of operation of the pump, the smaller space afforded for the seal between the washer 24 and the impeller surface 23 is accommodated not only by compression of the spring 27 but also by contraction of the seal 22 somewhat as indicated in Figure 3, the connecting parts 31 of the seal body flexing axially with the axial movement toward each other of the face parts 30, and the tube part 29 remaining relatively uncompressed. Conversely, when the shaft 16 moves to the right in Figure 1 and more space is afforded between the washer 24 and the impeller surface 23, the seal body tends to return under its own resilience (as well as the action of the spring 27) to the position indicated in Figure 2 in which the portions 32 and 33 of the connecting part 31 are again at right angles, instead of forming an acute angle as in the compressed position indicated in Figure 3.

In the expansion of the seal to accommodate a larger space therefor as last indicated, the coil spring 27 of course assists in a speeded and certain return of the seal body to expanded position, the spring 27 bearing against the inner faces of the face parts 30 of the seal body and tending to press these apart while leaving the tube 29 of the seal entirely free of the spring and connected to the face parts only by the flexible but resilient and elastic connecting parts 31. The spring 27 is advantageously centered by the shoulder provided between the parts 30 and 32.

In both contraction and expansion of the seal, the flange-like radially extending annular portion 33 of the seal body 22a desirably acts somewhat as a diaphragm responding rapidly and positively to the required movements.

So constructed and arranged each face part 30 presents to the element which it abuts, as for example, the washer 24 or impeller surface 23, an annular area 34, as best shown in Figure 5, which is of larger diameter, both for its internal and external diameter, than the tube part 29, and it is against this area 34 which the spring presses, the final coils of the spring at each end being also in the form of an annulus and desirably flattened as at 27a where it presses against the face part 30 as at 30a.

The spring 27 presses the face part 30 against the element with which it abuts desirably through the intermediation of concentrically annular ribs 35 and 36 on the annular area 34, thus providing a suction grove therebetween and enhancing the sealing effect of the body to effect a fluid-tight seal. The body 22a is thus counterbored as at 37 and the effective cooperation between the spring 27 and the body 22a and between the latter and the element against which it abuts, such as the washer 24 or impeller surface 23 is enhanced, the sealing action taking place adjacent the periphery of the seal where it is most effective.

The tube part 29 of the seal body may thus encircle the shaft 16 (as indicated in Figure 3 at 29a where is provided a bore for the shaft) at all times during both expansion or contraction of the seal and remaining relatively undistorted from its substantially tubular form throughout the operation of the seal in any normal expansion or contraction thereof, telescoping into the counterbores 37 at each end during compression of the seal, while free to flex when required.

I have found that a seal constructed in accordance with this invention has marked effectiveness and freedom from failure over indefinite periods of operation and under both normal and abnormal conditions. The thickened tube part for the seal tends to stabilize its structure and operation, while the connecting parts of sharply angular cross-section permit the face part of the seal and the tube part of the seal to act independently, each performing its respective functions without interference from the other, these functions being in each case materially different, while all at the same time cooperating in enhanced improvement in results of the seal as a whole.

It is to be understood that the function of the tube part 29 does not depend on any sealing action between the tube part and the shaft at 29a but that this is largely by way of stabilizing of the seal.

The connecting part 31 is flexible and somewhat elastic but not so flexible or elastic as to be inert but on the contrary has substantial resilience so as to cooperate in returning the face parts to extended position, so that the seal of the present invention does not rely entirely or even to any principal degree upon the spring 27 to cause it to expand when it is permitted to do so to take up a greater space afforded and to maintain the effectiveness of the seal.

In the present invention in which there is a progressive reduction of the diameter of the seal from the face part, through the connecting part, to the tube part, radial expansion of the parts is substantially eliminated and the axial movements of the parts is in complete harmony and consonance with the axial movement of the shaft and the axial movements of the cooperating spring, thus preventing slight variations in the molding of the seal from affecting its operation. Moreover, since the parts are not intended to fold upon each other, the effects of sediment or grit in the water upon the seal are obviated, and the moving parts of the seal are at all times clear of each other.

The invention is capable of such embodiments as fall within the scope of the appended claims.

Having described my invention, I claim:

1. An annular fluid seal comprising a body of rubber-like material having a central tubular part, annular diaphragm-like flange portions extending radially outwardly from each end respectively of said tubular part, said flange portions flexing axially toward and away from each other pivoting on said tubular part in compression and expansion of the seal, a cylindrical axial extension of each said flange portion extending axially outwardly of the flange portions at each end, said axial extensions moving axially toward and away from each other with movement of said flange portions, said flange portions and axial extensions forming a counterbore at each end of the seal, the corner between each flange portion and its respective axial extension being sufficiently sharp whereby the flange portions maintain substantially flange form throughout said flexing movements, and further diametrically enlarged annular face parts extending radially outwardly from the axial extensions respectively, said flange portions extending outwardly a sufficient distance and said axial extensions being of sufficient internal diameter whereby the tubular part telescopes at each end into said counterbores during compression of the seal.

2. An annular fluid seal comprising a body of rubber-like material having a central tubular part, annular diaphragm-like flange portions extending radially outwardly from each end respectively of said tubular part, the tubular part having a wall of substantially uniform cross-section of a thickness approximately twice the cross-sectional thickness of said flange portions, said flange portions flexing axially toward and away from each other pivoting on said tubular part in compression and expansion of the device, a cylindrical axial extension of each said flange portion extending axially outwardly of the flange portions at each end, said cylindrical axial extensions also moving axially toward and away from each other with movement of said flange portions, said flange portions and axial extensions forming a counterbore at each end of the seal, the corner between each flange portion and its respective axial extension being substantially square and sharp whereby the cross-sectional thickness diagonally across said corner is greater than the cross-sectional thickness of said flange portion, and further diametrically enlarged annular face parts extending radially outwardly from the axial extensions respectively, said flange portions extending outwardly a sufficient distance and said cylindrical extensions being of sufficient internal diameter whereby the tubular part telescopes at each end into said counterbores during compression of the device.

3. An annular fluid seal device comprising, a body of rubber-like material having a central tubular part of substantially uniform wall cross-section, annular diaphragm-like flange portions extending radially outwardly from each end respectively of said tubular part, said flange portions flexing axially toward and away from each other on said tubular part in compression and expansion of the device, a cylindrical axial extension of each said flange portion extending axially outwardly of the flange portions at each end, said cylindrical axial extensions also moving axially toward and away from each other with movement of said flange portions, said flange portions and axial extensions forming a counterbore at each end of the device, the corner between each flange portion and its respective axial extension being substantially square and sharp whereby the cross-sectional thickness diagonally across said corner is greater than the cross-sectional thickness of said flange portion, and further diametrically enlarged annular face parts extending radially outwardly from the axial extensions respectively, said flange portions extending outwardly a sufficient distance and said cylindrical extensions being of sufficient internal diameter whereby the tubular part telescopes at each end into said counterbores during compression of the device.

OLIN BRUMMER.